United States Patent [19]
Klingfus

[11] 3,863,472
[45] Feb. 4, 1975

[54] BICYCLE LOCKING DEVICE

[76] Inventor: Darel R. Klingfus, Rt. 5, Box 232B, Austin, Minn. 55912

[22] Filed: Jan. 7, 1974

[21] Appl. No.: 431,109

[52] U.S. Cl. .................................. 70/186, 70/233
[51] Int. Cl. .............................................. B62h 5/06
[58] Field of Search ............. 70/184, 185, 186, 233

[56] References Cited
UNITED STATES PATENTS

| | | | |
|---|---|---|---|
| 469,626 | 2/1892 | Copeland | 280/272 |
| 1,342,728 | 6/1920 | Welch | 70/252 |
| 1,736,900 | 11/1929 | Carpenter | 70/185 |
| 2,032,821 | 3/1936 | Waits | 70/185 |

*Primary Examiner*—Albert G. Craig, Jr.

[57] ABSTRACT

A bicycle locking device intended for locking the steering wheel of the bicycle against steering movement and including a lock containing member having a mounting ring adapted to fit about the tubular head of a bicycle into which the handle-bar post passes prior to its joining with the fork of the front wheel, the locking device including a plunger disposed diametrically to the tubular head and adapted to pass through an opening in the tubular head in a manner to engage an aperture in the handle bar post to prevent rotative movement thereof relative to the stem, the bicycle lock device being retained in position on the tubular head by the conventional lock nut associated with a bicycle as used in securing the handle bar post to the tubular head.

3 Claims, 7 Drawing Figures

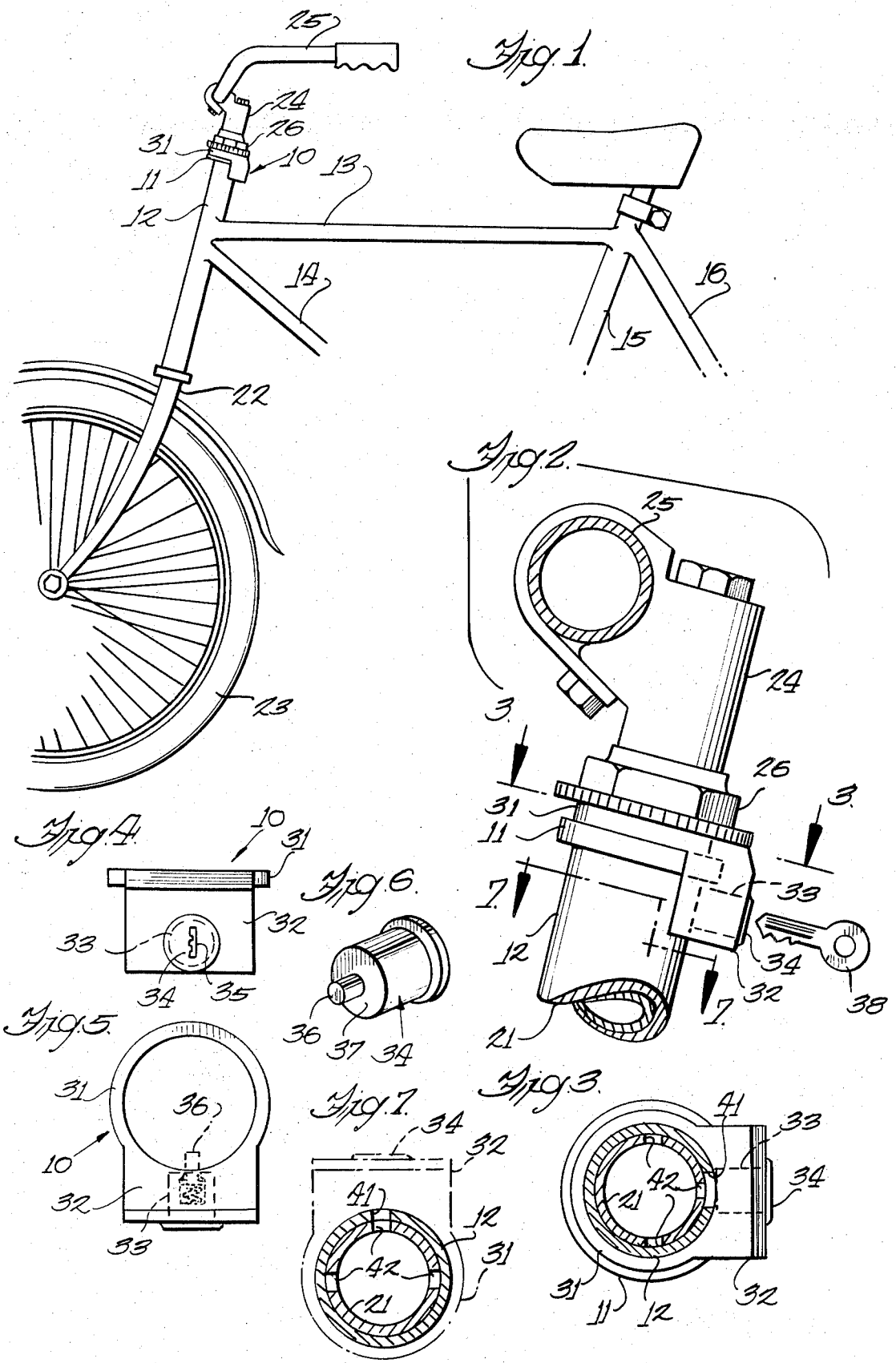

3,863,472

BICYCLE LOCKING DEVICE

BACKGROUND OF THE INVENTION

1. Field of the Invention

This invention relates generally to locking devices and more particularly to a novel and improved locking device intended for the locking of the front steering wheel of a bicycle against steering movement so as to make it extremely difficult for the bicycle to be ridden or carried away while it is locked.

2. Description of the Prior Art

The popularity of various outdoor recreational activities has increased notably during recent years, with the activity of bicycling becoming increasingly popular as the same affords both exercise to the rider as well as a non-pollutant means of transportation. However, in conjunction with the increased number and popularity of bicycles there has simultaneously increased the frequency with which bicycles are being stolen. In order to curtail the possibility of a bicycle being stolen, various types of locking mechanisms have been provided in the prior art, such as padlocks, chains, and the like, but all of these locking mechanisms suffer from one or more disadvantages as to being inefficient in design, requiring that the locking mechanism be carried and stored separately when not in use for locking the bicycle, being detracting from the appearance of the bicycle when temporarily stored thereon between periods of non-use, and the like.

It would thus be desirable to provide a bicycle locking device which would not detract from the appearance of the bicycle and which would be an integral part of the bicycle so as to be always readily available for use in locking the bicycle to minimize the possibility of theft of the bicycle.

SUMMARY OF THE INVENTION

The present invention recognizes the need for locking a bicycle as well as recognizing the deficiencies and disadvantages of presently available bicycle locking devices, and overcomes such deficiencies and disadvantages by providing a novel bicycle locking device including a locking mechanism adapted to be mounted about the tubular head portion of a bicycle and having a plunger adapted to pass through the tubular stem in a manner to engage an aperture provided in the handle bar post within the tubular head stem portion so as to make it impossible to steer the steering wheel of the bicycle.

It is a feature of the present invention to provide a bicycle locking device which may be manufactured and installed as part of the original equipment of the bicycle, or which may be readily attached at a later date to the bicycle as an accessory item by the bicycle owner without requiring any special skills or expertise and using only tools normally found around a home workshop.

A further feature of the present invention provides a bicycle locking device which is mounted on the bicycle in an inconspicuous position without detracting from the appearance of the bicycle and yet being in a position where it is conveniently accessible for locking or unlocking the steering wheel of the bicycle by means of a key.

Still a further feature of the present invention provides a bicycle locking device which is relatively simple in its construction and which therefore may be readily manufactured at a relatively low cost and by simple manufacturing methods.

Yet still a further feature of the present invention provides a bicycle locking device which is possessed of few parts and which therefore is unlikely to get out of order, and which is rugged and durable and which therefore may be guaranteed by the manufacturer to withstand many years of intended usage.

Yet still a further feature of the present invention provides a bicycle locking device which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a fragmentary side elevational view of a bicycle having the locking device of the present invention mounted thereon;

FIG. 2 is an enlarged fragmentary side elevational view of that portion of the bicycle frame onto which the present invention is mounted;

FIG. 3 is a cross-sectional view taken along Line 3—3 of FIG. 2;

FIG. 4 is a front elevational view of the bicycle lock device of the present invention;

FIG. 5 is a top plan view of the bicycle lock device of FIG. 4;

FIG. 6 is a rear perspective view of the key operated lock mechanism which forms a component part of the locking device; and FIG. 7 is a cross-sectional view taken along Line 7—7 of FIG. 2.

DESCRIPTION OF THE PREFERRED EMBODIMENT

Referring now to the drawings in detail there is illustrated a preferred form of a bicycle locking device constructed in accordance with the principles of the present invention and designated generally in its entirety by the reference numeral 10. The locking device 10 is shown mounted in its intended position on the flanged portion 11 of the hollow tubular head 12 to which are rigidly and permanently attached the conventional type tubular bicycle frame members 13, 14, 15 and 16. The tubular head 12 rotatably receives therein the hollow stem 21 connected at one end to the fork 22 in which the front wheel 23 is journaled for rotation, the opposite end of stem 21 projecting upwardly through tubular head 12 and terminating in a handle bar supporting portion 24 having a handle bar 25 affixed thereto in the cnventional manner. The stem 21 is secured to tubular head 12 for rotation relative thereto by the conventional bearing and collar assembly disposed inwardly of flange 11 with a lock nut 26 threaded to the tubular head in a conventional manner to secure the stem in position relative thereto.

The locking device 10 includes a ring shaped mounting member 31 adapted to fit about tubular head 12 and rest on the top surface of flange 11 intermediate the flange and the locking nut 26, the ring having a body portion 32 formed integrally therewith and disposed rearwardly of the tubular head 12. A cylindrical aperture 33 is provided in the body portion and extends radially with respect to the tubular head 12 and is adapted to receive therein a key operated locking mechanism 34 having a key slot in the front end thereof which effects the actuation of a spring loaded bolt 36 axially inward and outward relative to the back surface 37 of the lock mechanism. A key 38 is provided for the operation of the lock mechanism 34. Disposed in tubular head 12 in axial alignment with cylindrical opening 33 is an opening 41 adapted to permit free passage of the bolt 36 therethrough in a manner to engage one of a plurality of apertures 42 provided in stem 21 so as to prevent rotative movement of the stem 21 about its axis to thus prevent steering movement of the steering front wheel 23.

The plunger 36 is spring loaded such that insertion of key 38 into key slot 35 of lock mechanism 34 and rotating the key in one direction will effect the positive inward movement of the plunger 36 out of engagement with stem 21 such that the bicycle is free to be steered in the normal manner by the handle bars 25, whereas rotation of the key 38 in the opposite direction will effect the release of plunger 36 which, under urging of spring bias, will engage the exterior surface of stem 21 with movement of the handle bars 25 in a steering manner effecting the eventual alignment of one of the apertures 42 with the plunger 36 at which time the plunger will, due to spring pressure, project into the aligned aperture and thus lock the stem against any further rotative movement.

The apertures 42 are arranged about the circumference of the stem 21 in position to be aligned with the plunger 36 and are disposed in a manner to lock the steeirng wheel either in its normal straight-ahead position or, more preferably, at an angle to its normal straight-ahead position so as to make it impossible for the bicycle to be ridden and extremely difficult for the bicycle to be carried away once it is locked.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A locking device intended for locking the steering wheel of a bicycle against steering movement, the bicycle having a hollow tubular head with a circumferally formed flange at the top thereof containing the rotating bearing and collar assemblies, a hollow stem extending through the tubular head and connected at the bottom end to a fork in which the front wheel is journaled for rotation, the stem projecting upwardly through the hollow tubular head and connected at the top end to a handle bar post to which steering handle bars are connected, and a lock nut device threadedly received on the tubular head above the flange portion adapted to retain the stem and handle bar posts rotatably mounted relative to the tubular head, the locking device comprising:

a hollow ring shaped mounting member having an interior diameter adapted to receive said tubular head such that the mounting member rests on said tubular head flange portion intermediate said flange and said lock nut, a body portion formed integrally with said mounting member and projecting axially downwardly from one side thereof adapted to be disposed adjacent a portion of the circumferal side walls of said tubular head, an elongated cylindrical bore disposed in said body portion extending radially with respect to said tubular head and opening out of opposed exterior and interior surfaces of said body portion, a locking mechanism housing mounted in said bore and having an exterior surface projecting exteriorly of said exterior surface of said body portion and an interior surface restingly engaging against said interior surface of said bore, a locking mechanism disposed in said lock housing and having a key slot in the exterior surface thereof and a spring loaded key actuated plunger disposed concentrically of the back surface thereof and adapted for axial reciprocal movement in a direction inwardly of and outwardly of said bore, an opening disposed in said tubular head concentric with said bore and adapted to permit said plunger to pass freely therethrough, and an opening in said stem adapted to be disposed in alignment with said plunger in a preselected position of said stem relative to said tubular head whereby when desired said plunger may be operated to pass through said tubular head opening and engage said stem aperture to lock the stem against any rotative movement about its axis and thus lock the attached steering wheel against any steering movement.

2. The bicycle locking device as set forth in claim 1 wherein said plunger is spring loaded in a direction projecting outwardly of said lock housing, said locking mechanism being operable by a key between a first position where said plunger is positively mechanically withdrawn inwardly of said housing to permit free rotative movement of said stem about its axis, and to a second position wherein said plunger is mechanically released and urged under spring pressure outwardly of said lock housing in a manner to pass through said tubular head opening and engage against the exterior circumferal surface of said stem until said stem is rotated about its axis to a position aligning said stem aperture with said plunger at which time said plunger engages said aperture to prevent any further rotative movement of said stem.

3. The bicycle locking device as set forth in claim 2 wherein a plurality of apertures are disposed in said stem at circumferally spaced locations about the circumference thereof, said apertures adapted to be placed in alignment with said plunger in a manner to lock said stem and the associated steering wheel at various positions at an angle to the normal straight-ahead position of the steering wheel as well as it being possible to lock the steering wheel in its normal straight-ahead position so as to make it difficult for the vehicle to be ridden and carried away once the steering wheel is locked against rotation.

* * * * *